United States Patent
Krishnan et al.

(10) Patent No.: US 12,509,548 B2
(45) Date of Patent: Dec. 30, 2025

(54) ALKOXYLATED POLYMERS

(71) Applicant: SUN CHEMICAL CORPORATION, Parsippany, NJ (US)

(72) Inventors: Ramasamy Krishnan, North Brunswick, NJ (US); Ralph Arcurio, Bridgewater, NJ (US); Russell Schwartz, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 6 days.

(21) Appl. No.: 18/423,364

(22) Filed: Jan. 26, 2024

(65) Prior Publication Data

US 2024/0239957 A1 Jul. 18, 2024

Related U.S. Application Data

(63) Continuation of application No. 16/250,189, filed on Jan. 17, 2019, now Pat. No. 11,912,821, which is a continuation of application No. 15/311,897, filed as application No. PCT/US2015/031949 on May 21, 2015, now abandoned.

(60) Provisional application No. 62/002,300, filed on May 23, 2014, provisional application No. 62/006,948, filed on Jun. 3, 2014.

(51) Int. Cl.
| | |
|---|---|
| *C08G 63/91* | (2006.01) |
| *C08F 8/00* | (2006.01) |
| *C08F 220/14* | (2006.01) |
| *C08G 18/28* | (2006.01) |
| *C08G 18/75* | (2006.01) |
| *C08G 18/83* | (2006.01) |
| *C08G 63/199* | (2006.01) |
| *C08G 63/66* | (2006.01) |
| *C08G 63/668* | (2006.01) |
| *C08G 63/672* | (2006.01) |
| *C09D 11/101* | (2014.01) |
| *C09D 11/102* | (2014.01) |
| *C09D 11/104* | (2014.01) |
| *C09D 11/107* | (2014.01) |
| *C09D 133/12* | (2006.01) |

(52) U.S. Cl.
CPC ............. *C08G 63/916* (2013.01); *C08F 8/00* (2013.01); *C08F 220/14* (2013.01); *C08G 18/283* (2013.01); *C08G 18/755* (2013.01); *C08G 18/831* (2013.01); *C08G 63/199* (2013.01); *C08G 63/66* (2013.01); *C08G 63/668* (2013.01); *C08G 63/672* (2013.01); *C08G 63/91* (2013.01); *C09D 11/101* (2013.01); *C09D 11/102* (2013.01); *C09D 11/104* (2013.01); *C09D 11/107* (2013.01); *C09D 133/12* (2013.01)

(58) Field of Classification Search
CPC ... C09D 11/101; C09D 11/104; C09D 11/105; C09D 11/322; C09D 175/04; C09D 175/06
See application file for complete search history.

(56) References Cited

U.S. PATENT DOCUMENTS

| | | | |
|---|---|---|---|
| 4,543,369 A | 9/1985 | Peerman et al. | |
| 4,824,606 A * | 4/1989 | O'Lenick, Jr. ....... | C08G 63/682 |
| | | | 510/528 |
| 4,994,621 A | 2/1991 | Yeakey et al. | |
| 5,552,477 A | 9/1996 | Dhein | |
| 2007/0213501 A1 | 9/2007 | Bruchmann | |
| 2007/0299242 A1 | 12/2007 | Faecke | |
| 2009/0281240 A1 | 11/2009 | Li | |
| 2010/0093926 A1 | 4/2010 | Richards | |
| 2012/0094129 A1 | 4/2012 | Temple | |
| 2016/0024329 A1 | 1/2016 | Zhang | |

FOREIGN PATENT DOCUMENTS

| | | | | |
|---|---|---|---|---|
| EP | 704485 A2 * | 3/1996 | ............. | C08L 61/28 |
| EP | 1 357 141 A1 | 10/2003 | | |
| WO | WO 2006/110784 A2 | 10/2006 | | |
| WO | WO 2007023145 A2 | 3/2007 | | |
| WO | WO 2012089536 A1 | 7/2012 | | |
| WO | WO2013/134110 A1 | 9/2013 | | |
| WO | WO 2013/188746 A2 | 12/2013 | | |
| WO | WO 2014/044562 A1 | 3/2014 | | |

OTHER PUBLICATIONS

Search Report in European Patent Application 15 79 5330 dated Nov. 22, 2017.
Notification Concerning Transmittal of International Preliminary Report on Patentability issued in International Application No. PCT/US2015/031949 mailed Dec. 8, 2016.
PCT International Search Report issued in PCT/US2015/031949 mailed Aug. 10, 2015.
Written Opinion of the International Searching Authority issued in PCT/US2015/031949 mailed Aug. 10, 2015.

\* cited by examiner

*Primary Examiner* — Michael L Leonard
(74) *Attorney, Agent, or Firm* — Marian E. Fundytus; Amster Rothstein & Ebenstein LLP

(57) ABSTRACT

The present invention provides alkoxylated polymers. The alkoxylated polymers have two or more alkoxylated sites. The alkoxylated polymers can comprise any monomers and/or oligomers that contain one or more functional groups with an active hydrogen. The alkoxylated polymers are useful in any application for which polymers are generally used. For example, the alkoxylated polymers are useful as additives in ink and coating compositions.

29 Claims, No Drawings

ALKOXYLATED POLYMERS

CROSS REFERENCE TO RELATED APPLICATIONS

The present application is a Continuation application of U.S. Application No.: 16/250,189, filed Jan. 17, 2019 which is a Continuation application of U.S. application Ser. No. 15/311,897, filed Nov. 17, 2016, which is a § 371 National Phase application based on PCT/US2015/031949 filed May 21, 2015, which claims the benefit of U.S. Provisional Application Nos. 62/002,300, filed May 23, 2014 and 62/006,948, filed Jun. 3, 2014, the subject matter of each of which is incorporated by reference in their entirety.

FIELD OF THE INVENTION

The present invention is in the field of polymers and polymer development. Described herein are alkoxylated polymers.

BACKGROUND

Today, the use of polymers is ubiquitous. As polymers have been developed and improved, their versatility has increased. For example, everyday items such as food packaging (e.g. bags and bottles), adhesives, protective films, optical elements, flexible foams, paints, varnishes, printing inks and coatings, as well as may others, employ polymers in some way. Polymers may be used as a binder in a composition, forming a solid film or structure. Polymers may also be used as additives in, for example, paints, inks, and coatings. When used as additives, they be used as dispersants for other components of a composition, or as diluents to increase solubility of other components in a composition.

For example, polymers are used in several ways in printing ink and coating compositions. Many printers seek to increase their productivity by employing high speed printing. However, as printing speed increases, there is a greater tendency for printing defects. Moreover, because of the constraints placed upon ink formulations suitable for high speed printing, other properties, such as opacity, gloss, scratch resistance, and laydown of the ink are often compromised.

Because high speed printing inks and coatings must have a low viscosity, the amount of solids in a formulation must often be reduced. However, if the amount of solids in an ink or coating is limited, it is difficult to load enough colorant to achieve the desired opacity and gloss. Thus, there is often a compromise between the desired opacity and gloss, and the maximum printing speed.

Gloss is affected by the smoothness of a printed ink or coating. A rough coating will reflect less light, and therefore gloss will be reduced. Therefore, it is important that the laydown of an ink or coating is such that a smooth printed surface is formed.

Properties related to the durability of the ink or coating, such as scratch resistance, are also impacted by the constraints of high speed printing formulations. Binders and resins that have a low enough viscosity to be printed at high speed often produce tacky, soft printed surfaces. The tacky, soft printed surfaces are not durable, and properties such as scratch resistance are compromised.

Thus, the ideal ink or coating for high speed printing would have seemingly incompatible characteristics. A high speed printing ink or coating must have a low viscosity. But, it is often desired to achieve high opacity, which requires a higher solids loading (i.e. colorant), which leads to higher viscosity. Although durable coatings are desired, binders and resins that have a low viscosity suitable for high speed printing are often not durable.

Coating and ink compositions (such as varnishes, paints, and printing inks) are colored by the incorporation of dyes or pigments. While dyes are generally soluble, pigments are not. Therefore, to achieve good color intensity, gloss, hiding power, lightfastness, weather resistance etc. when pigments are used, the pigment particles must be homogeneously mixed into the composition.

To achieve a homogeneous mixture, pigments are dispersed in the liquid coating composition. Stable dispersion of a pigment entails three steps: wetting of the pigment particles (or aggregates or agglomerates of pigment particles) by the coating (generally resin) solution; dispersion of the pigment particles into the liquid (through mechanical energy); and stabilization. Dispersing agents can be used to achieve the first and third steps.

During wetting, the resin solution replaces the air between the pigment particles, aggregates, and/or agglomerates. Aggregates are groups of primary pigment particles connected at their face through intermolecular forces. Agglomerates are similar to aggregation, but are groups of primary particles connected at their edges and corners through weaker attractions to each other than aggregates. To achieve wetting of the pigment particles, a dispersing agent (also known as a surfactant) can be added to the composition to modify the surface tension of the liquid and the interfacial tension between the liquid and the pigment particles.

During the second, dispersing step, mechanical force, in the form of impact and shear forces, is applied to the composition. This can be done by mixing with, for example, a bead mill or a roll mill. This breaks up the pigment agglomerates into smaller units, which are uniformly distributed (i.e. dispersed) into the liquid composition. However, without the third step, stabilization, the pigment particles tend to regroup, or flocculate, and the pigment would no longer be dispersed.

Addition of dispersing agents to the liquid composition stabilizes the pigment particles, and prevents them from flocculating. One family of dispersing agents is polymeric dispersants. Polymeric dispersants stabilize the dispersion by "steric stabilization." One part of a polymeric dispersant, the anchoring group, adsorbs onto the pigment particles. The other part, the polymeric chain, is soluble in the liquid composition, and extends into the liquid composition. A layer is formed around the pigment particles, effectively keeping them separated, and preventing flocculation. The pigment particles thus remain evenly dispersed in the liquid composition.

WO 2010/149962 teaches the use of a styrenic branched addition copolymer as a dispersant in a gaseous, liquid or solid formulation wherein the copolymer is obtainable by addition polymerization. These copolymers can be used as dispersants for pigments; or as dispersants for inks, paints, sealants, tinters, powder coatings, and injection molding applications.

US 2010/0145001 relates to a branched, hybrid polymer obtained by addition polymerization, preferably a free radical polymerization process, comprising organic chains and inorganic chains. The copolymers may be incorporated into compositions containing only a carrier or diluent, or also comprising an active ingredient. The copolymers are particularly suitable for use in laundry compositions, especially as agents to prevent transfer of dye back onto the fabric.

US 2011/0283908 is directed to high opacity polyurethane resins produced by the polymerization of polyisocyanates with polymeric polyols and subsequent chain extension with polyamines. The resins are capable of providing high opacity printing inks when formulated with white pigments.

Although a range of polymers have been developed for specific functions, polymers formulated to have wide ranging uses are more challenging. For example, with the increasing drive for productivity, there is a need to formulate inks and coatings that have high opacity and durability, while having a low viscosity suitable for high speed applications, such as high speed printing. The choice of polymers used is critical to achieving these desired properties.

SUMMARY OF THE INVENTION

The present invention provides alkoxylated polymers. The alkoxylated polymers have two or more alkoxylated sites. The alkoxylated polymers can comprise any monomers and/or oligomers that contain one or more functional groups with an active hydrogen.

In a particular aspect, the present invention provides an alkoxylated polymer comprising:
 a) a backbone with one or more alkoxylated sites;
 b) terminal ends each of which is a site that can be alkoxylated; and
 c) and one or more polyfunctional monomers or oligomers having two or more functional polar groups with an active hydrogen, or mixtures thereof.

The functional polar groups are preferably hydroxyl, carboxyl, thiol, amino, imino, amido, or ureido. Preferably, at least one of the monomers and/or oligomers is functionalized by one or more functional hydroxyl groups.

In a particular aspect, the present invention provides an alkoxylated polyester comprising:
 a) a backbone with one or more alkoxylated sites;
 b) terminal ends each of which is a site that can be alkoxylated;
 c) one or more di- or higher functional polyols; and
 d) one or more diacids or anhydrides, or mixtures thereof.

In a particular aspect, the present invention provides an alkoxylated polyurethane comprising:
 a) a backbone with one or more alkoxylated sites;
 b) terminal ends each of which is a site that can be alkoxylated;
 c) one or more diisocyanates; and
 d) one or more di- or higher functional polyols.

In a particular aspect, the present invention provides an alkoxylated polyacrylic comprising:
 a) a backbone with one or more alkoxylated sites;
 b) terminal ends each of which is a site that can be alkoxylated;
 c) one or more hydroxyl functional acrylic monomers, or carboxyl functional acrylic monomers, or mixtures thereof;
 d) one or more additional acrylic or styrenic monomers; and
 e) one or more di- or higher functional polyols.

The alkoxylated polymers can be used for any purpose for which polymers are generally used, including, but not limited to, ink and coating compositions, packaging such as bags and bottles, electrical applications such as insulators or conductors on circuit boards, adhesives, protective films, flexible foams, optical elements, etc. Preferably, the alkoxylated polymers are used as additives in ink and coating compositions. Preferred are high speed printing inks. The alkoxylated polymers may, for example, function as dispersants or as low tack binders in the ink and coating compositions. Advantageously, the alkoxylation of the polymers renders them more compatible with other polymers and resins typically found in ink and coating compositions. The opacity, gloss, scratch resistance, and laydown of a printing ink can be improved by incorporating the alkoxylated polymer into the printing ink.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the term "backbone" of a polymer chain is a sequence of polymerized monomer units ("monomer residues").

As used herein, a "pendant" group is a group that is attached to the backbone of a polymer. The term pendant may be used to describe a group that is actually part of a polymerized monomer unit.

As used herein, a "terminal end" or "terminal group" is located at the end of the polymer chain and is chemically attached to a terminal monomer unit. A terminal group may, for example, have a composition distinct from the composition of the backbone of the polymer. A "pendant" group may occur in a "terminal" position. As such, a "terminal" group is a special case of a "pendant" group.

As used herein, the term "laydown" or "lay" in the context of printing refers to the smoothness and evenness of a printed ink or varnish. Poor lay or laydown means that the solid print areas of a printed ink or varnish are not of a completely uniform film thickness.

As used herein, the terms "opacity" or "contrast ratio opacity" of a pigmented ink or coating refers to its ability to cover the color or color differences of a substrate. Opacity depends on the amount of light that is transmitted through, or reflected from, the surface of the ink. More opaque colorants have a greater tendency to reflect and refract light.

As used herein, the term "gloss" of an ink is a measure of its ability to reflect incident light. It largely depends on whether or not the ink forms a smooth film on the surface of the substrate.

As used herein, the term "di- or higher" when referring to compounds with functional groups means to a chemical compound with two or more functional groups with an active hydrogen. Such functional groups include hydroxyl, carboxyl, thiol, amino, imino, amido, and ureido.

As used herein, "tri- or higher functional polyol" refers to a chemical compound with three or more functional hydroxyl groups. A polyol may be a polymer with three or more functional hydroxyl groups.

As used herein, the term "diol" refers to a chemical compound with two functional hydroxyl groups. A diol may be a polymer with two functional hydroxyl groups.

As used herein, the term "additional functional groups," when used in the context of an alkoxylated polymer, refers to the presence of different functional groups on the polymer backbone, such as, for example, COOH, in addition to the functional hydroxyl groups.

As used herein, "acid value" is the weight in milligrams of KOH required to neutralize the pendant carboxylate groups in one gram of polymer.

As used herein, "hydroxyl value" is a measure of the number of hydroxyl groups present in a polymer. It is expressed as the weight in mg of KOH required to neutralize the hydroxyl groups in one gram of polymer. It is determined by acetylation using acetic anhydride, and titration of the acetic acid and excess anhydride with KOH.

As used herein, "polydispersity" or "dispersity" is the measure of the broadness of a molecular weight distribution of a polymer. It is calculated as $M_w/M_n$, wherein $M_w$ is the weight average molecular weight of the polymer, and $M_n$ is the number average molecular weight of the polymer. A polydispersity index ratio of 1 means that all the chain lengths are equal.

As used herein, "yield value," is a feature of the non-Newtonian behavior of inks, wherein a distinct shear stress or force is required before any deformation or flow takes place.

As used herein, "Tg" or "glass transition temperature" is the temperature range where a thermosetting polymer changes from a hard, rigid or "glassy" state to a more pliable, compliant or "rubbery" state.

Alkoxylated Polymers

In a particular aspect, the present invention provides an alkoxylated polymer comprising:
 a) a backbone with one or more alkoxylated sites;
 b) terminal ends each of which is a site that can be alkoxylated; and
 c) one or more polyfunctional monomers or oligomers having two or more functional polar groups with an active hydrogen, or mixtures thereof.

The functional polar groups are preferably hydroxyl, carboxyl, thiol, amino, imino, amido, or ureido. Preferably, at least one of the monomers and/or oligomers comprises one or more functional hydroxyl groups, such as trimethylol propane.

The alkoxylated polymer may be any polymer suitable for the intended use. Examples of alkoxylated polymers include, but are not limited to, polyester, polyurethane, polyacrylic, and polyamide. Preferably, the alkoxylated polymer is an alkoxylated polyester.

There is no restriction on the monomers and/or oligomers used, as long as they can be functionalized with one or more of the functional polar groups discussed herein. Examples of monomers and/or oligomers that can be used include, but are not limited to, acrylic and methacrylic monomers, styrenic monomers, vinyl monomers, acrylonitrile monomers, butadiene monomers, alkene or alkenylene monomers, allyl monomers, and the like.

Polymers may include terminal functional groups which can be alkoxylated. There may also be functional groups along the backbone of the polymer, either as part of the polymer chain, or as pendant groups. Any site with a functional group can be alkoxylated according to the present invention. Preferably, at least one of the alkoxylated sites is on the backbone of the polymer chain.

The polymers can be alkoxylated using an etherification process. The etherification process comprises reacting a monofunctional polyalkylene oxide glycol with a hydroxyl functional polymer. An esterification process can also be used, wherein a monofunctional polyalkylene oxide glycol is reacted with a carboxylic acid functional polymer. The monofunctional polyalkylene used in these reactions is preferably monofunctional polyethylene glycol or monofunctional polypropylene glycol.

The alkoxylated polymers can also be synthesized by reacting poly(oxypropylene), preferably having one terminal hydroxyl group, with a diacid or anhydride to obtain a carboxyl functional reaction product, and reacting the product therefrom with a hydroxyl functional base polymer, and obtaining a product having ether groups at each hydroxyl site of the base polymer. Alternatively, an alkoxylated polymer could be made by reacting a poly(oxypropylene) with a diepoxide to obtain an epoxy functional reaction product, which is then reacted with a hydroxyl functional base polymer, to obtain a polymer having ester groups formed at each hydroxyl of the base polymer. Similarly, instead of the diacid/anhydride or diepoxide, the first step would react the poly(oxypropylene) with a diisocyanate, to produce an isocyanate functional reaction product, which is then reacted with a hydroxyl functional base polymer, to obtain a polymer with urethane functional groups at each hydroxyl of the base polymer.

Any suitable alkoxylation can be used. Suitable alkoxylations include ethoxylation, propoxylation, and butoxylation. Preferably, the polymers are propoxylated.

Suitable hydroxyl functional monomers and/or oligomers include any type of monomers and/or oligomers having two or more functional hydroxyl groups. Hydroxyl functional monomers and/or oligomers may contain only hydroxyl functional groups, or other functional groups in addition to the hydroxyl groups. Examples of hydroxyl functional monomers and/or oligomers include, but are not limited to trimethylol propane, ethylene glycol, diethylene glycol, 1,4-butandiol, 1,3-propanediol, hexanediol, 2-methyl-1,3-propanediol, neopentylglycol, trimethylolethane, pentaerythritol, glycerol, 1,2,4-benzenetriol, 1,3,5-benzenetriol, 1,2,3-benzenetriol, and the like. Preferably, at least one of the polyfunctional monomers and/or oligomers is trimethylol propane.

Suitable carboxyl functional monomers and/or oligomers include any type of monomers and/or oligomers having two or more functional carboxyl groups. Carboxyl functional monomers and/or oligomers may contain only carboxyl functional groups, or other functional groups in addition to the carboxyl groups. Examples of carboxyl functional monomers and/or oligomers include, but are not limited to, acrylic and methacrylic acid, itaconic acid, crotonic acid, maleic acid, succinic acid, malonic acid, diethyl malonic acid, monobutyl maleate, 1,3-acetonedicarboxylic acid, azelaic acid, benzylmalonic acid, biphenyl-4,4'-dicarboxylic acid, 1,3,5-cyclohexanetricarboxylic acid, cyclohexylsuccinic acid, and the like.

Suitable thiol functional monomers and/or oligomers include any type of monomers and/or oligomers having two or more functional thiol groups. Thiol functional monomers and/or oligomers may contain only thiol functional groups, or other functional groups in addition to the thiol groups. Examples of thiol functional monomers and/or oligomers include, but are not limited to, trimethylolpropane tris(3-mercaptopropionate); trimethylolpropane tris(2-mercaptoacetate); pentaerythritol tetrakis(2-mercaptoacetate); pentaerythritol tetrakis(3-mercaptopropionate); 2,2'-(ethylenedioxy)diethanethiol; 1,3-propanedithiol; 1,2-ethanedithiol; 1,4-butanedithiol; tris[2-(3-mercaptopropionyloxy)ethyl]isocyanurate; and 3,4-ethylenedioxythiophene, and the like.

Suitable amino functional monomers and/or oligomers include monomers and/or oligomers having two or more functional amino groups. Amino functional monomers and/or oligomers may contain only amino functional groups, or other functional groups in addition to the amino groups. Examples of amino functional monomers and/or oligomers include, but are not limited to, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine, ethylenediamine, propylenediamine, and tris(2-diaminoethyl)amine, and the like.

Suitable imino functional monomers and/or oligomers include monomers and/or oligomers that have two or more functional imino groups. Imino functional monomers and/or oligomers may contain only imino functional groups, or other functional groups in addition to the imino groups. Examples of imino functional monomers and/or oligomers include, but are not limited to, bis(imino)pyridine; 3,3'-iminodipropionitrile; [2,6-bis(1-phenylimino)ethyl]pyridine, and the like.

Suitable amido functional monomers and/or oligomers include monomers and/or oligomers that have two or more functional amido groups. Amido functional monomers and/or oligomers may contain only amido functional groups, or other functional groups in addition to the amido group. Examples of amido functional monomers include, but are not limited to, norbornene diamide, 1,6-diazacyclododecane-2,5-dione, and the like.

Suitable ureido functional monomers and/or oligomers include monomers and/or oligomers that have two or more ureido functional groups. Ureido functional monomers and/or oligomers may contain only ureido functional groups, other functional groups in addition to the ureido functional groups. Examples of ureido functional monomers include, but are not limited to, dimethylbis(ureido)silane, ureidopyrimidinone, and the like.

Advantageously, the alkoxylated polymers may be functionalized by one or more diacids or anhydrides, or mixtures thereof. Suitable diacids include, but are not limited to, adipic acid, phthalic acid, terephthalic acid, maleic acid, isophthalic acid, dimethyl isophthalate, 1,4-cyclohexanediarbocylic acid, dimethyl terephthalate, sebacic acid, azelaic acid, and the like. Suitable anhydrides include, but are not limited to, tetrahydrophthalic anhydride, hexahydrophthalic anhydride, phthalic anhydride, trimellitic anhydride, maleic anhydride, succinic anhydride, and the like. Preferably, the anhydride is tetrahydrophthalic anhydride.

Advantageously, the alkoxylated polymers may be functionalized by one or more COOH functional diols. Examples of COOH functional diols include, but are not limited to, dimethylolpropionic acid, dimethylolbutanoic acid, and the like. Preferably, the COOH functional diol is dimethylolpropionic acid.

The present invention is drawn to alkoxylated polymers. The alkoxylated polymers can be used for any purpose wherein polymers are used. Such uses include, but are not limited to, ink and coating compositions, packaging such as bags and bottles, electrical applications such as insulators or conductors on circuit boards, adhesives, protective films, flexible foams, road surfacing, etc. For example, the alkoxylated polymers can be used in printing inks and coatings to improve the opacity, gloss, scratch resistance, and laydown of the printing inks and coatings. Preferably, such printing inks and coatings are high speed printing inks and coatings. Thus, the present invention is also drawn to printing inks and coatings comprising the alkoxylated polymers.

In a preferred example, the alkoxylated polymers are useful as additives in ink and coating compositions. The polymers are useful as dispersants, and as low tack binders, in inks and coatings. When used as printing ink additives, the alkoxylated polymers enable one skilled in the art to formulate printing inks having various improved properties. In the case of colored flexographic and colored gravure printing inks, the printing inks comprising the alkoxylated polymers exhibit higher opacity at a viscosity which is comparable to commercially available printing inks. Alternatively, the printing inks of the invention have lower viscosity than commercially available printing inks at equal opacity. In the case of printing inks that contain colorants other than white (or in combination with white colorants), the printing inks of the present invention exhibit lower viscosity and improved laydown versus printing inks that do not contain the alkoxylated polymers of the present invention.

The alkoxylated polymers of the present invention may be used as a dispersant or low tack binder in all types of printing ink formulations, including but not limited to solvent-based, water-based and energy-curable printing ink formulations. Preferably, the printing inks are flexographic or gravure printing ink formulations. Preferably, the printing inks or coatings are energy curable.

Occasionally, one or more polymers, or resins, in an ink or coating composition do not work well together. In a preferred example, the alkoxylation of the polymer improves the compatibility of the polymer with other polymers and resins in an ink or coating composition.

The alkoxylated polymers may be present in a printing ink or coating in an amount of from about 0.1 to 20 wt %; 0.1 to 15 wt %; 0.1 to 11 wt %; or 0.1 to 5 wt %. The alkoxylated polymers may be present in a printing ink or coating in an amount of from about 0.5 to 15 wt %; 0.5 to 5.0 wt %; or 1.0 to 2.0 wt %.

Colorants suitable for use in the printing ink formulations of the present invention include, but are not limited to, organic or inorganic pigments and dyes. The dyes include, but are not limited to, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

As with most printing ink formulations or compositions, additives may be incorporated to enhance various printing and printability properties of the printing ink. A partial list of such additives include, but is not limited to, adhesion promoters, light stabilizers, de-gassing additives, flow promoters, defoamers, antioxidants, UV stabilizers, surfactants, dispersants, plasticizers, rheological additives, waxes, silicones, etc.

Synthesis of Alkoxylated Polymers

Alkoxylated polymers can be prepared in several ways. The following synthetic schemes are representative of processes that can be used. It is to be understood that these are exemplary only, and one of skill in the art may use other processes, which would also fall within the scope of the invention.

General Scheme for Alkoxylation of Hydroxyl Functional Polymers by Polymerization of an Alkylene Oxide One process for preparing alkoxylated polymers involves the polymerization of an alkylene oxide. The polymerization initiator is typically an alcohol and the catalyst employed in the reaction is a base (typically alkali metal or alkali earth hydroxide or cyanide). When the initiator is, for example, propylene glycol or water, the resulting polymer is linear. The alkoxylation reaction is typically run under pressure (for example 3 to 7 bar) and at an elevated temperature (for example 100° C. to 160° C.). The synthesis below illustrates a process wherein the alkylene oxide is propylene oxide.

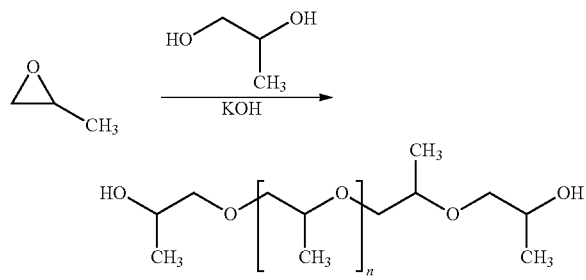

General Scheme for Alkoxylation of Hydroxyl Functional Polymers Using a Polymerization Initiator Another process for preparing alkoxylated polymers includes the use of a polymerization "initiator," such as, for example, any hydroxyl functional polyester. The resulting alkoxylated polymer will be slightly branched. The scheme shown below is a generalized alkoxylation reaction scheme, illustrating the use of propylene oxide as the alkylene oxide. The resulting trifunctional structure could be a "base" hydroxyl functional polyester as described below.

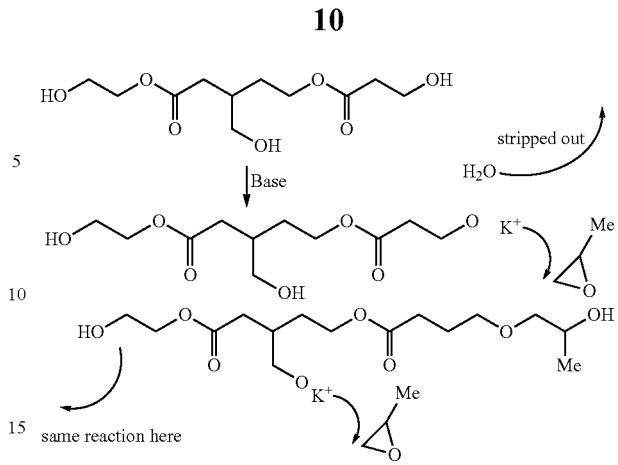

Once all of the primary hydroxyls have reacted with propylene oxide, the secondary hydroxyls, formed during the initial propoxylation, will begin to react with propylene oxide. This reaction will continue on all of the secondary hydroxyls until all of the propylene oxide has reacted resulting in polypropylene oxide (PO) units at each of the original primary hydroxyl sites. The number of PO units can be regulated through initial PO charge, catalyst, temperature and pressure.

It will be understood by one skilled in the art that the processing conditions are for exemplary purposes and that the processing steps and/or materials could be modified and still fall within the scope of the present invention. It is also well understood and readily accepted by one skilled in the art that the exemplary polyester described in Scheme 2 may comprise additional functional groups, e.g. carboxylic moieties, which may also participate in alkoxylation and that other alkylene oxides may be substituted for the propylene oxide. Suitable oxide substitutes include, but are not limited to, butylene oxide, ethylene oxide, styrene oxide and diepoxides like bisphenol A diglycidyl ether. Finally, it will be further understood by one skilled in the art that other hydroxyfunctional polymers comprising hydroxyl and/or carboxylic acid functionality may be substituted for the polyester, e.g. acrylic or epoxy polymers.

Alkoxylation of Hydroxyl Functional Polyester-Polyether Block Copolymers

U.S. Pat. No. 6,753,402 B1 (Example 4) teaches the preparation of a polyester-polyether block copolymer. In a 250 ml stirring autoclave, 2.0 g of the DMC (double metal cyanide) catalyst as described in Example 3 of the patent is dispersed in 130 g of polyesterol A at 110° C. The subsequently acquired suspension is then evacuated at 3 mbar for 2 hours. The reaction mixture is subsequently made inert by means of 10 bar nitrogen pressure. At an autoclave pressure of 0.5 bar of nitrogen and a temperature of 1300 C, 70 g of propylene oxide is then added over a period of 5 minutes using a nitrogen admission pressure of 10 bar. After 2 hours, the reaction mixture is degassed at a reduced pressure of 5 mbar and a temperature of 100° C. One skilled in the art would be aware that one could substitute KOH or another alkali metal or alkaline earth hydroxide or oxide for the DMC catalyst and could substitute the hydroxyl functional polymer with the polyesterol.

U.S. Pat. No. 6,753,402 B1 (Example 5) teaches the preparation of a polyester-polyether block copolymer. In a 250 ml stirring autoclave, 1.0 g of the DMC catalyst as described in Example 3 of the patent is dispersed in 130 g of polyesterol B at 110° C. The subsequently acquired suspension is then evacuated at 3 mbar for 2 hours. The reaction mixture is subsequently made inert by means of 10 bar nitrogen pressure. 70 g of propylene oxide is then added at 130° C. After 3 hours, the reaction mixture is degassed at a reduced pressure of 4 mbar and a temperature of 90° C. One skilled in the art would be aware that one could substitute KOH or another alkali metal or alkaline earth hydroxide or oxide for the DMC catalyst and could substitute the hydroxyl functional polymer with the polyesterol.

Preparation of Polyoxyalkylene Diols

U.S. Pat. No. 2,425,845 teaches the preparation of mixtures of polyoxyalkylene diols and methods of making such mixtures (Example 1 of the patent). A polyoxyalkylene glycol starting material of relatively low molecular weight is prepared. The moisture content of the diethylene glycol is about 0.15 percent and of the mixed oxides, about 0.07 percent. The reaction mixture is vigorously agitated and maintained at a temperature of about 119° C. to 127° C. throughout the reaction. About 15 minutes into the reaction, the oxides are supplied to the reaction mixture at a rate to maintain a pressure of about 16 psi. After the oxides are added, the reaction mixture is recycled for a period of 30 minutes. A part of the reaction product is neutralized to a pH of 7 to 8, with concentrated sulfuric acid, and filtered. The reactor product is a liquid found to have a viscosity of 26.8 centistokes (127 Saybolt Universal seconds) at 100° F., and an average molecular weight of about 227 (as determined by its acetyl value).

A mixture of 60 parts of ethylene oxide and 20 parts of 1,2-propylene oxide is introduced into a reactor containing 20 parts of the unneutralized reactor product resulting from the above procedure at a rate to maintain a pressure of about 22 to 30 psi over a period of about 1 hour. No additional sodium hydroxide is added and the moisture content of the oxides is the same as above. A temperature of about 111° C. to 122° C. is maintained during the reaction and the reaction mixture is recycled for about one-half hour after all the oxides are introduced. The product is a liquid which is found to contain about 0.25 percent of water and to have an alkalinity (calculated as sodium hydroxide) of about 0.78 percent.

A part of the reaction product is then neutralized with concentrated sulfuric acid and filtered. The resulting product is a liquid having a viscosity of 112.6 centistoke (520 S. U. S.) at 100° F. and an average molecular weight of about 1,060 (as determined by acetylation). This diol composition is found also to be miscible in all proportions with cold water. One skilled in the art would be aware that one could substitute hydroxyl functional polymers for the unneutralized polyoxyalkylene glycol synthesized in the procedure.

Butoxylation of Hydroxyl Functional Polymer

U.S. Pat. No. 5,145,948 A (Example 1) teaches an alkali polymerization catalysts reaction where two adducts of 1,2-butylene oxide with alcohols are prepared. A dehydrated mixture of the alcohol used as the initiator and KOH is initially taken in a pressure vessel, the amount of KOH used being about 0.01 to 1, preferably 0.05 to 0.5, e.g. 0.1, % by weight of the expected total weight of the reaction product. The vessel is then flushed several times with nitrogen and heated to 140° C. to 150° C., after which the 1,2-butylene oxide is fed continuously or batch wise in the reaction mixture with stirring, at constant temperature and under from 5 to 30 bar, via a dip tube or onto the surface, until the desired viscosity is reached. The volatile constituents are removed, advantageously under reduced pressure, and, if necessary, the product is clarified by filtration. One skilled in the art would be aware that one could substitute hydroxyl functional polymers for the dehydrated mixture of the alcohol.

Alkoxylation of Hydroxyl Functional Polymers Using Poly (Oxypropylene) and Anhydride Polymers may be produced, without using epoxides, from LB fluids. LB Fluids (manufactured by Dow Chemical) are alcohol-started base stocks featuring oxypropylene groups with one terminal hydroxyl group. They are available in variety of molecular weights varying by the amount of PO.

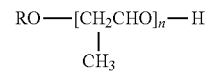

Procedure (Step 1)

Esterify a selected LB fluid with enough anhydride as required (e.g. tetrahydrophthalic anhydride) so that all of the hydroxyls on the LB fluid are end capped with the anhydride leaving a carboxyl group at the end of each LB fluid.

One skilled in the art would be aware that the acid functional polymer of Step 1 could be omitted and proceed directly to Step 2.

Procedure (Step 2)

The carboxyl functional reaction product from step 1 is then reacted with a hydroxyl functional polyester (or polyurethane or acrylic) at an equimolar ratio forming ester groups at each hydroxyl site on the "base" polymer. The resulting polymer would be almost identical to a propoxylated hydroxyl functional polymer except for the ester linkages and the fact that the polymer would not have a hydroxyl value. The propoxylated polymer will have secondary hydroxyl functionality at the end of the propoxylation chain providing the final polymer with a hydroxyl value. It will be appreciated by one skilled in the art that a monofunctional polyethylene glycol could be substituted for the LB fluid, to yield a similar propoxylated material.

Synthesis of Branched Low-Tg Polyesters with Endcappers

Long chain branched polyesters are synthesized using monofunctional endcappers such as 1-dodecanol and poly (propylene glycol) monobutyl ether to avoid gelation at high conversions. Poly(propylene glycol) monobutyl ether 1-dodecanol endcapped polyesters are synthesized following a similar procedure as explained above. Branching reagent (trimethyl benzene-1,3,5-tricarboxylate, 2 mol %), is pre-reacted with diethylene glycol at 180° C. for 30 min and subsequently a diester monomer (dimethyl cyclohexane-1, 4-dicarboxylate) is added. The reaction proceeds under nitrogen atmosphere at 200° C. for 4 h and the endcappers are added and the temperature set to 220° C. over 30 min. Vacuum is applied gradually and the temperature is then set to 250° C. for 2 hours. Aliquots of the reaction mixture are removed from the reaction mixture and analyzed using size exclusion chromatography (SEC). The solubility of the samples are tested in chloroform and the reaction is stopped prior to the gel point of the reaction mixture.

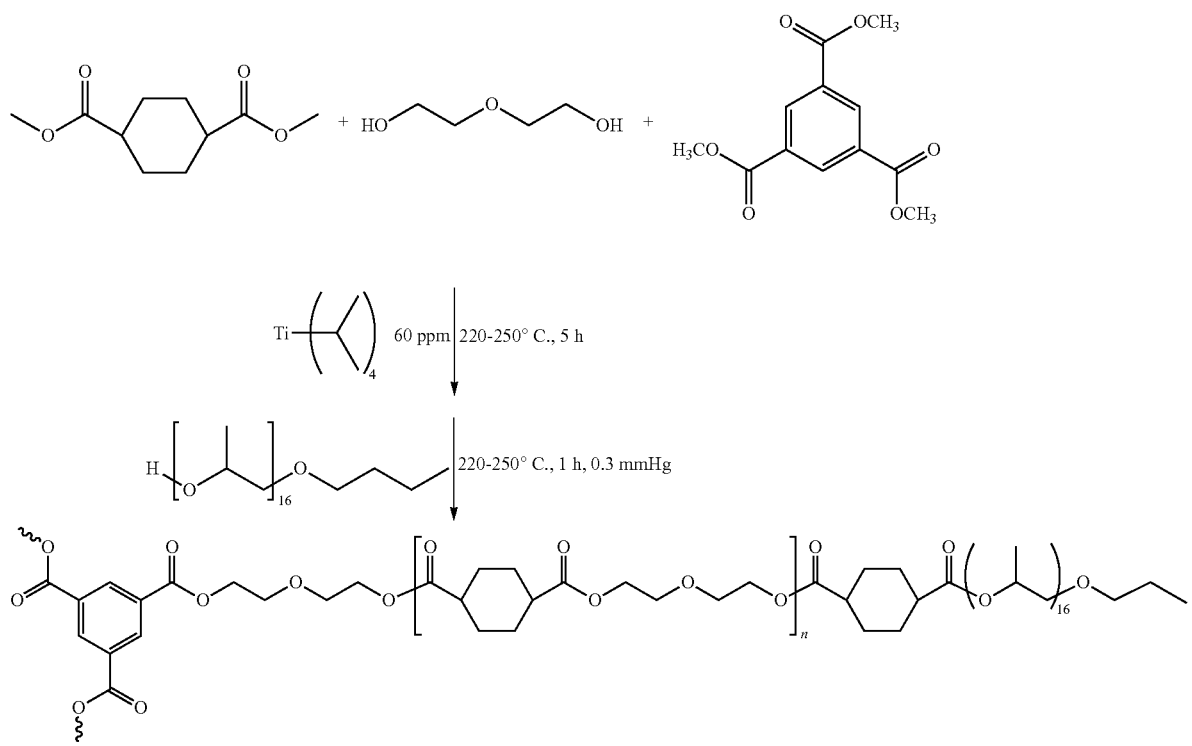

Alkoxylation of Hydroxyl Functional Polymers Using Poly(Oxypropylene) and Epoxides Polymers are produced by reacting epoxides with LB fluids. LB Fluids (manufactured by Dow Chemical) are alcohol-started base stocks featuring oxypropylene groups with one terminal hydroxyl group. They are available in variety of molecular weights varying by the amount of PO.

Procedure (Step 1)

Selected LB fluid is reacted with enough diepoxide (for example, resorcinol glycidyl ether) so that all of the hydroxyls on the LB fluid are end capped with the diepoxide leaving an epoxy group at the end of each LB fluid.

Procedure (Step 2)

The epoxy functional reaction product from Step 1 is then reacted with a hydroxyl functional polyester (or polyurethane or acrylic) at an equimolar ratio forming ether groups at each hydroxyl site on the "base" polymer. The resulting polymer is almost identical to the propoxylated polymers except for the fact that the resulting polymer will not have a hydroxyl value. The propoxylated polymer will have secondary hydroxyl functionality at the end of the propoxylation chain providing the final polymer with a hydroxyl value. It will be understood by one skilled in the art that a monofunctional polyethylene glycol could be substituted for the LB fluid, to yield a similar material and that ether linkage may be formed starting with a hydroxyl functional polymer, e.g. a hydroxy functional polyester. It will be understood by one skilled in the art that a hydroxy functional alkylene oxide could be substituted with acid catalysts to furnish an alkoxylated polymer, e.g. an alkoxylated polyester.

Alkoxylation of Hydroxyl Functional Polymers Using Poly(Oxypropylene) and Diisocyanate Polymers may be produced, without using epoxides, from LB fluids. LB Fluids (manufactured by Dow Chemical) are alcohol-started base stocks featuring oxypropylene groups with one terminal hydroxyl group. They are available in variety of molecular weights varying by the amount of PO.

Procedure (Step 1)

React a selected LB fluid with enough diisocyanate as required (e.g. isophoronediisocyanate) so that all of the hydroxyls on the LB fluid are end capped with the diisocyanate leaving an isocyanate group at the end of each LB fluid.

Procedure (Step 2)

The isocyanate functional reaction product from step 1 is then reacted with a hydroxyl functional polyurethane (or polyester or acrylic) at an equimolar ratio forming urethane groups at each hydroxyl site on the "base" polymer. The resulting polymer would be almost identical to a propoxylated hydroxyl functional polymer except for the urethane linkages and the fact that the polymer would not have a hydroxyl value. The propoxylated polymer will have secondary hydroxyl functionality at the end of the propoxylation chain providing the final polymer with a hydroxyl value. It will be appreciated by one skilled in the art that a monofunctional polyethylene glycol could be substituted for the LB fluid, to yield a similar propoxylated material.

EXAMPLES

The following examples illustrate specific aspects of the present invention and are not intended to limit the scope thereof in any respect and should not be so construed.

Synthesis of Alkolylated Polymers

Examples 1 to 10 describe the synthesis of alkoxylated polymers.

Example 1

An alkoxylated hydroxyl functional polyester was synthesized according to the formulation in Table 1.

TABLE 1

Alkoxylated hydroxyl functional polyester

| | Material | Amount (%) |
|---|---|---|
| A | Trimethylol propane | 36.5 |
| B | 1,4-butanediol | 17.5 |
| C | Tetrahydrophthalic anhydride | 52.4 |
| D | Water-decanted from condensation polymerization | −6.4 |
| Total | | 100.0 |

To a thoroughly cleaned and purged reactor, components (A), (B), and (C) were added. The reactor was then purged with nitrogen and the temperature brought to about 170° C. over 1 hour. The temperature of the reactor was slowly brought to 217° C., and the condenser temperature was not allowed to exceed 100° C. Water formed as a result of the polymerization reaction was removed via a decanter. The reaction was continued at 217° C. until the acid value was below 7. Once the acid value was below 7, the reaction mixture was filtered and discharged, and cooled to 135° C., and the alkoxylation reaction (more specifically here propoxylation) was begun.

Example 2

An alkoxylated hydroxyl and carboxyl functional polyester was synthesized according to the formulation in Table 2.

TABLE 2

Alkoxylated hydroxyl and carboxyl functional polyester

| | Material | Amount (%) |
|---|---|---|
| A | Trimethylol propane | 33.7 |
| B | Dimethylolpropionic acid | 24.1 |
| C | Tetrahydrophthalic anhydride | 48.2 |
| D | Water-decanted from condensation polymerization | −6.0 |
| Total | | 100.0 |

To a thoroughly cleaned and purged reactor, components (A), (B), and (C) were added. The reactor was then purged with nitrogen and the temperature brought to about 170° C. over 1 hour. The temperature of the reactor was slowly brought to 183° C. until the acid value of the reaction mixture was 85. Once the acid value was 85, the reaction mixture was filtered and discharged, and cooled to 135° C., and the propoxylation reaction begun.

Although the alkoxylated hydroxyl functional polyesters in Examples 1 and 2 were synthesized "neat" (without solvents), the polyester could also be synthesized in the presence of one or more solvents. Examples of suitable solvents that could be used in the synthesis include, but are not limited to, petroleum solvents (e.g. heptane); alcohols (e.g. propyl alcohol, isopropyl alcohol, butyl carbitol, propasol p (1-propoxy-2-propanol), diacetone alcohol, etc.); esters (e.g. ethyl acetate, propyl acetate, pm acetate (1-methoxy-2-propyl-acetate), isopropyl acetate), and the like.

Additionally, other materials could be used instead of, or in addition to, the materials A, B, and C recited in Examples 1 and 2. Examples of such materials include, but are not limited to, the following:

Material A: trifunctional (and above) polyols such as trimethylolethane, pentaerythritol, glycerol, 1,2,4-benzenetriol, 1,3,5-benzenetriol, 1,2,3-benzenetriol.

Material B:—COOH functional diols, such as dimethylolbutanoic acid.

Material B: other low MW short-chain diols could also be used, such as ethylene glycol, 1,4 butandiol, 1, 3 propane diol, pentanediol, hexanediol, 2-methyl-1,3-propanediol, neopentylglycol.

Material C: Diacids and/or anhydrides such as hexahydrophthalic anhydride, phthalic anhydride, isophthalic acid, trimellitic anhydride, maleic anhydride, succinnic anhydride, dimethyl isophthalate, 1,4-cyclohexanedicarboxylic acid, dimethyl terephthalate, adipic acid, sebacic acid, azelaic acid.

Example 3

An alkoxylated hydroxyl functional polyester was synthesized according to the formulation of 3a in Table 3 (Step 1) and formulation 3b in Table 4 (Step 2).

TABLE 3

Synthesis of Example 3a (Step 1)

| | Material | Amount (%) |
|---|---|---|
| A | UCON LB-65 | 69.1 |
| B | Tetrahydrophthalic anhydride | 30.9 |
| Total | | 100.0 |

To a thoroughly cleaned and purged reactor, components (A) and (B) were added. The reactor was then purged with nitrogen and the temperature brought to 187° C. until an acid value of 115 was reached. The polymer was poured out hot (solids=100%; viscosity=1,200 cps).

TABLE 4

Synthesis of Example 3b (Step 2)

| | Material | Amount (%) |
|---|---|---|
| A | OH-functional polyester of Example 1 | 28.9 |
| B | 3a | 71.1 |
| Total | | 100.0 |

To a thoroughly cleaned and purged reactor, components (A) and (B) were added. The reactor was then purged with nitrogen and the temperature brought to 220° C. The polymer gels.

Example 4

Example 4 was synthesized in the same manner as Example 3, except that the tetrahydrophthalic anhydride in Step 1 was replaced with isophorone diisocyanate. An alkoxylated hydroxyl functional polyester was synthesized according to the formulation of 4a in Table 5 (Step 1) and formulation 4b in Table 6 (Step 2).

TABLE 5

Synthesis of Example 4a (Step 1)

| | Material | Amount (%) |
|---|---|---|
| A | UCON LB-65 | 60.5 |
| B | Isophorone diisocyanate | 39.5 |
| Total | | 100.0 |

To a thoroughly cleaned and purged reactor, components (A) and (B) were added. The reactor was then purged with nitrogen and the temperature brought to 65° C. until % NCO=7.5% was reached. The polymer was poured out hot (solids=100%; viscosity=700 cps).

TABLE 6

Synthesis of Example 4b (Step 2)

| | Material | Amount (%) |
|---|---|---|
| A | OH-functional polyester of Example 1 | 26.9 |
| B | 4a | 73.1 |
| Total | | 100.0 |

To a thoroughly cleaned and purged reactor, components (A) and (B) were added. The reactor was then purged with nitrogen and the temperature brought to 90° C. until % NCO<0.05%. The solid was dissolved in an 80/20 blend of n-propanol/n-propyl acetate at 60% solids. Viscosity was 440 cps.

Example 5

An alkoxylated polymer can be made according to the following procedure. 635 g of a polyester of ethylene glycol and adipic acid (OH-number 177) (1 mol) and 700 g of polypropylene 3 ether glycol (OH-number 160) (1 mol) are introduced into a flask fitted with a descending condenser. The reaction mixture is first dehydrated with stirring at temperature of 130° C., and a pressure of 12 mmHg. Then, 0.035 ml of concentrated sulphuric acid is introduced into the anhydrous melt at about 100° C. under a current of nitrogen. The temperature is then gradually raised to 220° C., when the elimination of water due to etherification sets in. After 9 hours at 220° C. and 0.4 mmHg, the OH number is found to be about 84, and the acid number about 0.17. After a further 8 hours condensation at 220° C. and 0.4 mmHg, the OH-number is about 57.8 and the acid number is about 0.4. The total amount of distillate obtained is about 23 g. The sulphuric acid in the condensation product is neutralized by adding 0.3 g of barium carbonate with stirring, and the product is left to cool. The waxy condensation product has a softening point of 28° C. Expected Yield: 1300 g.

Example 6

Propoxylated polyesters were made as described in Examples 6a and 6b.

Example 6a

A 250 ml flask was filled with 0.0124 moles (71.9 g) of a poly(ethylene glycol-polypropylene glycol-polyethylene glycol) tri-block copolymer (5800 daltons, Sigma-Aldrich), 0.319 moles (33.2 g) of neopentyl glycol (Sigma-Aldrich) and 0.329 moles (48.7 g) of phthalic anhydride (Sigma-Aldrich). It was blanketed with nitrogen and heated to 90° C. Mechanical stirring was started and the temperature increased to 130° C. Then, 0.002 moles, (0.40 g) para-toluene sulfonic acid monohydrate (Sigma-Aldrich) was added. The reaction was heated to 160° C. for 3 hours, and then to 190° C. for 4 hours. Water was removed from the system via a dean-stark trap. The reaction was stopped and the clear resin was poured into a lined metal can. $M_w$ via GPC was 7500 Dalton, polydispersity 1.24.

Example 6b

A 250 ml flask was filled with 0.0124 moles (71.9 g) of a poly(ethylene glycol-polypropylene glycol-polyethylene glycol) tri-block copolymer (5800 daltons, Sigma-Aldrich), 0.319 moles (33.9 g) of diethylene glycol (Sigma-Aldrich) and 0.312 moles (46.2 g) of phthalic anhydride (Sigma-Aldrich). It was blanketed with nitrogen and heated to 140° C. Mechanical stirring was started and 0.002 moles, (0.40 g) para-toluene sulfonic acid monohydrate (Sigma-Aldrich) was added. The temperature was increased to 180° C. for 7 hours. Water was removed from the system via a dean-stark trap. The reaction was stopped and the clear reddish-colored resin was poured into a lined metal can. $M_w$ via GPC was 3600 Dalton with a polydispersity of 4.8.

Example 7

A hydroxyl functional polyurethane is synthesized according to the formulation in Table 7.

TABLE 7

Alkoxylated polyurethane

| | Material | Amount (%) |
|---|---|---|
| A | n-Propyl acetate | 40.0 |
| B | Trimethylol propane | 18.29 |
| C | 1,4-butanediol | 8.47 |
| D | K-KAT 348 | 0.0046 |
| E | Isophoronediisocyanate | 33.2354 |
| Total | | 100.0 |

To a thoroughly cleaned and purged reactor, components (A), (B), (C) and (D) were added. When (B) was dissolved, (E) was added over 30 minutes. The reactor temperature was then brought to 85° C. over 2 hours.

To alkoxylate the polyurethane, you hold the reaction at a temperature of 85° C. until % NCO<0.1%. Once the % NCO is below 0.1%, filter and discharge the product, or vacuum strip off the n-propyl acetate, bring reaction temperature to 135° C. and begin alkoxylation (more specifically propoxylation).

Example 8

An alkoxylated polyurethane was synthesized according to the formulation in Tables 8 and 9.

TABLE 8

Synthesis of 8a (Step 1)

| | Material | Amount (%) |
|---|---|---|
| A | UCON LB-65 | 60.496 |
| B | Isophorone diisocyanate | 39.5 |
| C | K-KAT 348 (catalyst) | 0.004 |
| | Total | 100.0 |

To a thoroughly cleaned and purged reactor, components (B) and (C) were added. The reactor was then purged with nitrogen and the temperature brought to 65° C. at which time (A) was added over 6 hours while maintaining a reaction temperature below 68° C. Once all of (A) was added, the temperature was held at 65° C. until % NCO=7.5% was reached. The polymer was poured out hot (solids=100%; viscosity=700 cps).

TABLE 9

Synthesis of 8b (Step 2)

| | Material | Amount (%) |
|---|---|---|
| A | OH-functional polyurethane of Example 7 | 25.2* |
| B | 8a | 44.9* |
| C | n-Propanol | 29.9 |
| | Total | 100.0 |

*The amount of A & B must be calculated (hydroxyl and NCO equivalents should be equal) each time based on their OH value (A) & % NCO (B)

To a thoroughly cleaned and purged reactor, component (A) was added. The reactor was then purged with nitrogen and the temperature brought to 90° C. Item (B) was then added over 20 minutes. Once all of (B) had been added, the temperature was held at 90° C. until % NCO=<0.05%. Then (C) was added, and the product cooled and discharged. The final polymer had a solids content of 60% and a viscosity of 1,090 cps.

Example 9

An alkoxylated alkoxylated hydroxyl/carboxyl functional polyacrylate is synthesized according to the formulation in Table 10.

TABLE 10

Alkoxylated hydroxyl/carboxyl functional polyacrylate

| | Material | Amount (%) |
|---|---|---|
| A | Ethyl acetate | 45.0 |
| B | Methyl Methacrylate | 15.97 |
| C | Butyl Methacrylate | 11.71 |
| D | 2-Ethylhexyl Acrylate | 4.68 |
| E | Hydroxypropyl Acrylate | 6.09 |
| F | Methacrylic Acid | 10.3 |
| G | Vazo 52 (CAS # 4419-11-8) | 1.25 |
| H | Ethyl acetate | 5.0 |
| | Total | 100.0 |

1. Add (A) to a clean reactor with slow nitrogen blanket. Set reactor overhead for reflux conditions. Start mixing and heat to 77° C. to reflux.
2. Add (G-H) and (B-F) simultaneously (separate feeds) over 3 hours while maintaining reflux (reaction temperature of 77-78° C.).
3. Once these additions are complete, hold for 3 hours and increase reaction temperature to 77-79° C.
4. Vacuum strip/distill off the ethyl acetate. The resulting polyacrylate will have a hydroxyl value of 55 and an acid value of 138. Once all ethyl acetate is removed, increase reaction temperature to 135° C. and begin alkoxylation reaction (more specifically propoxylation).

Example 10

An alkoxylated carboxyl functional polystyrene/acrylic is synthesized by alkoxylating (more specifically propoxylating) a solid carboxyl functional commercial styrene/acrylate (for example Joncryl 682 or Joncryl 678, both manufactured by BASF).

Printing Inks Comprising the Alkoxylated Polymers

Examples 11 to 23 describe the preparation and testing of printing inks. The properties of the printing inks were tested using the following methods:

Viscosity: Viscosity was measured using a Viscolite 700 viscometer from Hydramotion Co.

Opacity: Opacity was measured using a BNL-3 Opacimeter by Technidyne, set on opacity readings.

Adhesion: Adhesion was measured by the 610 scotch tape test according to ASTM F2252-03.

Gloss: Gloss was measured using a BYK-Micro Tri Gloss at an angle of 60 degrees.

Scratch Resistance: Scratch resistance was measured by scratching the printed ink or coating with the back of a fingernail (10 scratches).

Wear: Wear was measured with the Sutherland Rub Tester using 100 rubs with a 4 pound test strip.

Laydown: Laydown was assessed by optical microscopy using bright field illumination.

Particle Size: Particle size was measured by laser diffraction.

Example 11

Two white inks were assembled, one using the alkoxylated polymer from Example 4 (Example 11a in Tables 11 and 12), the other the alkoxylated polyester of Example 1 (Example 11b in Tables 11 and 12). The inks were formulated with equal percent solids of dispersant. The inks were prepared according to the formulations in Table 7.

TABLE 11

Formulation of flexographic white printing inks

| | Example 11a | Example 11b |
|---|---|---|
| Unirez 2221 | 6.6 | 6.6 |
| Example 1 | / | 0.23 |
| Example 4b (70%) | 0.32 | / |
| TR52 (TiO$_2$) | 28.92 | 28.92 |
| Akawax (erucamide) | 0.7 | 0.7 |
| Normal propanol | 9.52 | 9.59 |
| N-propyl acetate | 2.00 | 2.02 |
| Propasol P | 1.70 | 1.70 |
| Tap water | 0.25 | 0.25 |
| Total | 100.0 | 100.0 |

The inks were printed using a Harper Phantom Proofer (flexographic) on bread bag polyethylene. Test results are shown in Table 12. Both inks showed good contrast ratio opacity when printed at press viscosity with Example 11a having an opacity of 57.31, and 11b with an opacity of 56.07. The viscosity (low) at equal pigment loading of the experimental ink was similar to the standard. The maximum tack value of the two inks was similar. Print quality of both inks was also favorable.

TABLE 12

Test performance of flexographic white inks

|  | Example 11a | Example 11b |
|---|---|---|
| Viscosity (cps) | 112.3 | 102.0 |
| Tack | 9.1 | 8.4 |
| Opacity | 57.31 | 56.07 |
| Adhesion | Good | Good |
| Wear (15 sec) | Good | Good |
| Scratch (nail) | Good | Good |

Example 12

A flexographic white printing ink was prepared according to the formulation in Table 13.

TABLE 13

Flexographic white printing ink

|  | Material | % | Typical Range |
|---|---|---|---|
| A | n-propanol | 21.4 | 5-50% |
| B | diacetone alcohol | 4.0 | 0-20% |
| C | styrene allylalcohol resin SAA-100 | 2.4 | 0-10% |
| D | Example 1 Alkoxylated Hydroxyl Functional Polyester | 10.6 | 2-30% |
| E | Plasticizer | 2.1 | 0-10% |
| F | dibutyl sebacate | 0.3 | 0-10% |
| G | Dowanol DPM (dipropylene glycol monomethyl ether) | 3.0 | 0-20% |
| H | butyl acetate | 1.5 | 0-20% |
| I | n propyl acetate | 3.0 | 0-20% |
| J | TR52 TiO$_2$ | 48.0 | 0-75% |
| K | adhesion promoter | 2.5 | 0-10% |
| L | propasol p | 1.2 | 0-20% |
|  | Total | 100.0 |  |

A print test was performed comparing the opacity of the Example 12 white printing ink to two commercially available printing inks at a similar viscosity. The two commercially available printing inks were Flexomax White (Sun Chemical) and a White (Seigwerk). The printing inks were printed on a polyethylene substrate with a K-coater using a number 2 coating rod. Their viscosity was measured using a Viscolite 700 Viscometer. The opacity of the printing inks was measured using a BNL-3 Opacimeter. The results are shown in Table 14.

TABLE 14

Properties of flexographic white printing inks

|  | Flexomax White (Comparative) | Seigwerk White (Comparative) | Example 12 |
|---|---|---|---|
| Opacity | 47.6 | 47.9 | 53.3 |
| Viscosity | 121 | 115 | 127 |

Table 14 shows that the Example 12 printing ink has higher opacity at similar viscosity than two commercially available printing inks. In another embodiment, the Example 12 printing ink could be reduced in viscosity such that it is lower in viscosity to the two commercial printing inks while having equivalent opacity. In another embodiment, inks could be made using the Example 1 polyester to produce printing inks based on colorants other than a white colorant or TiO$_2$, and the printing ink could have increased opacity and/or color strength vs. commercial (prior art) printing inks at equivalent viscosity, or can be supplied at lower viscosity and equal opacity and/or color strength. In another embodiment, the formulation could be supplied without colorants at lower viscosity vs. commercial (prior art) formulations.

Examples 13 and 14

Flexographic white printing inks were prepared according to the formulations in Table 15 (Example 12) and Table 16 (Example 13).

TABLE 15

Example 12 flexographic white printing ink (comparative)

| Material |  | Amount (%) |
|---|---|---|
| n-propyl alcohol | Solvent | 25.2 |
| tap water | Solvent | 0.5 |
| Propasol P | Solvent | 3.9 |
| Unirez 2221 | polyamide resin | 18.5 |
| TR 52 | TiO$_2$ | 51.5 |
| Finawax E | erucamide wax | 0.4 |
| Total |  | 100.0 |

TABLE 16

Example 13 flexographic white printing ink

| Martertial |  | Amount (%) |
|---|---|---|
| n-propyl alcohol | Solvent | 15 |
| n-propyl acetate | Solvent | 3.8 |
| Unirez 2221 | polyamide resin | 14 |
| Example 1 Alkoxylated Hydroxyl Functional Polyester |  | 0.5 |
| TR 52 | TiO$_2$ | 61.1 |
| AKAWAX E | erucamide wax | 1.5 |
| tap water | solvent | 0.5 |
| Propasol P | solvent | 3.6 |
| Total |  | 100.0 |

A print trial was performed on a Chestnut printing press (21" Sig 2 on a 360/5.0 anilox) onto polyethylene bread bag stock. The following printing ink properties were evaluated:

Adhesion (610 tape test);

Gloss (BYK Tri-Glossmeter 60 degree);

Scratch Resistance (10 rubs with back of fingernail);

Opacity (BNL-3 Opacimeter) and Laydown (visual assessment).

The test results are reported in Table 17.

TABLE 17

Properties of flexographic white printing inks

| Property | Example 12 (comparative) | Example 13 |
|---|---|---|
| Adhesion | Pass | Pass |
| Gloss | 60 | 64 |
| Scratch Resistance | Pass | Pass (improved) |
| Opacity | 52.5 | 55.4 |
| Laydown | Pass | Pass (improved) |

Table 17 shows that the addition of an alkoxylated polyester (in this case propoxylated polyester) to a white flexographic printing ink as a dispersant, improves the opacity, gloss, scratch resistance and laydown of the printing ink versus a comparative printing ink which does not contain a propoxylated polyester dispersant of the present invention.

Examples 15 and 16

Gravure white printing inks were prepared according to the formulations in Table 18 (Example 15) and Table 19 (Example 16).

TABLE 18

Example 15 gravure white printing ink (comparative)

| Matertial | Amount (%) |
|---|---|
| Isopropyl Acetate | 14.50 |
| Ethyl Alcohol | 8.00 |
| N-Propyl Acetate | 8.00 |
| Nitrocellulose | 28.75 |
| Plasthall ESO (epoxidized soybean oil) | 7.00 |
| Kronos 2063 $TiO_2$ | 22.80 |
| TR-50 $TiO_2$ | 6.00 |
| ASP-G90 - clay extender | 1.50 |
| MP22XF Paraffin Wax | 1.65 |
| Adhesion Promoter | 1.80 |
| Total | 100.00 |

TABLE 19

Example 16 gravure white printing ink

| Matertial | Amount (%) |
|---|---|
| Isopropyl Acetate | 14.50 |
| Ethyl Alcohol | 8.00 |
| N-Propyl Acetate | 8.00 |
| Nitrocellulose | 18.75 |
| Plasthall ESO (epoxidized soybean oil) | 7.00 |
| Example 1 Alkoxylated Hydroxyl Functional Polyester | 1.0 |
| Kronos 2063 $TiO_2$ | 31.80 |
| TR-50 $TiO_2$ | 6.00 |
| ASP-G90 - clay extender | 1.50 |
| MP22XF Paraffin Wax | 1.65 |
| Adhesion Promoter | 1.80 |
| Total | 100.0 |

Using the same test method as described in Examples 13/14, the opacity of the Example 15 printing ink was 45 and the viscosity was 60 cps. The opacity of the Example 16 printing ink was 52 and the viscosity was 60 cps. Examples 15 (Comparative) and 16 show that, using the propoxylated polyester, it is possible to formulate a printing ink with a considerably higher titanium dioxide level (and thus higher opacity) at a similar viscosity.

Examples 17 and 18

Solvent-based flexographic magenta printing inks were prepared according to the formulations in Table 20 (Example 17) and Table 21 (Example 18).

TABLE 20

Example 17 solvent-based flexographic magenta printing ink (Comparative)

| Material | Amount (%) |
|---|---|
| Slow Lithol Rubine base | 50 |
| Polyurethane varnish | 40 |
| 80/20 N-propanol/propyl acetate | 10 |
| Total | 100 |

The printing ink of Example 17 (Comparative) was a highly thixotropic printing ink, typically most magentas colored printing inks are, and had a yield value of 1500 dynes/cm (as measured on a TA Instruments AR1500 rheometer at 250° C.).

TABLE 21

Example 18 solvent-based magenta printing ink

| Material | Amount (%) |
|---|---|
| Slow Lithol Rubine base | 50 |
| Polyurethane varnish | 39 |
| Example 1 Alkoxylated Hydroxyl Functional Polyester | 1.0 |
| 80/20 N-propanol/propyl acetate | 10 |
| Total | 100 |

The printing ink of Example 18 exhibited a reduced yield value (down to 400 dynes/cm. using the same test method as described in Example 13). This resulted in better laydown for the printing ink (assessed visually).

Examples 17 and 18 show that the addition of an alkoxylated polyester (in this case propoxylated polyester) to a solvent based flexographic magenta printing ink, reduces viscosity and improves laydown of the printing ink.

Examples 19 and 20

UV flexographic white printing inks were prepared according to the formulations in Table 22 (Example 19) and Table 23 (Example 20).

TABLE 22

Example 19 UV flexographic white printing ink (Comparative)

| Material | Amount (%) |
|---|---|
| Ketone resin | 36.0 |
| HDODA- Hexane diol diacrylate | 4.0 |

TABLE 22-continued

Example 19 UV flexographic white printing ink (Comparative)

| Material | Amount (%) |
|---|---|
| GENORAD 16 Inhibitor | 0.3 |
| IGM TPO photoinitiator | 4.0 |
| Tetrahydrofurfuryl Acrylate monofunctional monomer | 12.7 |
| TI-PURE R-706 TiO$_2$ | 42.0 |
| BYK-501 dispersant | 1.0 |
| Total | 100.0 |

Example 19 ink had a viscosity of 4600 centipoise using the test method described in Example 11.

TABLE 23

Example 20 UV flexographic white printing ink

| Material | Amount (%) |
|---|---|
| Ketone resin | 35.0 |
| HDODA- Hexane diol diacrylate | 4.0 |
| GENORAD 16 Inhibitor | 0.3 |
| IGM TPO photoinitiator | 4.0 |
| Tetrahydrofurfuryl acrylate monofunctional monomer | 12.7 |
| Example 1 alkoxylated hydroxyl functional polyester | 1.0 |
| TI-PURE R-706 TiO$_2$ | 42.0 |
| BYK-501 dispersant | 1.0 |
| Total | 100.0 |

Example 20 ink had a viscosity of 1150 centipoise. This resulted in better laydown for the ink (assessed visually using the printing method described in Example 12).

Examples 19 and 20 show that the addition of propoxylated polyester to the printing ink formulation as a dispersant reduces viscosity and improves laydown in a UV-curing flexographic white printing ink.

In the above examples, the alkoxylated polymer was incorporated directly into the formula during the preparation of the finished printing ink formulation. In an alternate embodiment, the alkoxylated polymer could be incorporated into a dispersion which is then later made into a finished printing ink. This is a common base/concentrate printing ink formulation practice used in preparing conventional printing inks where a dispersion and letdown vehicle system are employed.

Example 21

These alkoxylated polymer samples from Examples 1 and 6 were used to evaluate the effectiveness of incorporating them as dispersants in a typical solvent based white flexographic printing ink. White inks were made using a standard formulation and adding the polymeric dispersant of Example 1, Example 6a or Example 6b propoxylated polyesters (Table 24).

TABLE 24

| | White inks | | |
|---|---|---|---|
| | Ex. 1 | 6a | 6b |
| Polyamide | 13.65 | 13.65 | 13.65 |
| Example 1 | 0.3 | | |
| Example 6a | | 0.3 | |
| Example 6b | | | 0.3 |
| TiO2 | 56.1 | 56.1 | 56.1 |
| Akawax (erucamide) | 0.4 | 0.4 | 0.4 |
| Alcohol | 24.2 | 24.2 | 24.2 |
| Acetate | 5.15 | 5.15 | 5.15 |
| additive | 0.2 | 0.2 | 0.2 |
| TOTAL | 100 | 100 | 100 |

Inks were coated onto clear polyethylene film using a Phantom proofer (Harper) 6.8 volume 200 line anilox. The films were air dried at 43° C. for 60 seconds. Each of the inks were tested for viscosity using a Viscolite model 700 (Hydramotion) and for opacity with a BNL-3 Opacimeter (Technidyne). Viscosity of the undiluted ink was measured. The amount of solvent (%) required to reduce the inks to printing viscosity (i.e. 60 cps) is indicated in Table 25. The inks were printed at 60 cps, and opacity of the dried inks measured. The results are shown in Table 25.

TABLE 25

| Opacity of the white inks | | | |
|---|---|---|---|
| | Ex. 1 | 6a | 6b |
| Viscosity | | | |
| Uncut (cps) | 165.5 | 233.7 | 224.8 |
| Amount of solvent (%) required to reduce viscosity to 60 cps | 15 | 16 | 16 |
| Opacity | 53.0 | 52.7 | 52.5 |

The viscosity of the inks using Example 6a and Example 6b as a dispersant before dilution was higher than the ink using Example 1 as the dispersant. The opacity of the printed inks was equal.

Example 22

The particle size of a white reference ink (SL-800 White) alone was compared to the particle size of SL-800 with the addition of either of Example 6a or 6b alkoxylated polyesters. Particle size measurements were made at 25° C. on a Laser Light Scattering (LLS) instrument, model LB 500 manufactured by Horiba, using SL-800 ink as the standard. Results are shown in Table 26.

TABLE 26

| Median particle size of reference ink alone and with Examples 6a and 6b added | | | |
|---|---|---|---|
| | SL-800 White alone | SL-800 with 2.0% Example 6a added | SL-800 with 2.0% Example 6b added |
| Median particle size (nm) | 1460 | 1200 | 1111 |

Particle size comparison indicates a modest reduction in particle size with the addition of either of the two alkoxylated polyesters compared to the particle size of the SL-800 white sample in the absence of either dispersant. Particle size was reduced from about 1450 nm to 1100-1200 nm.

Example 23

A white flexographic ink was made using the formulation in Table 27.

TABLE 27

White flexographic ink

| Material | Amount (%) |
| --- | --- |
| Normal propyl alcohol | 3.9 |
| Propoxylated polyurethane (Example 8) | 16.1 |
| Nitro cellulose varnish | 6.0 |
| Polamide resin (UNIREZ 2248) | 2.0 |
| Titanium dioxide (TR52) | 55.0 |
| Propasol p solvent | 17.0 |
| Total | 100.0 |

The ingredients are in weight percentage. The resulting ink had a viscosity of 320 cps. When let down to press ready viscosity of 78 cps and printed using a flexographic proofer on a polyethylene substrate, the print showed excellent adhesion and scratch resistance. The opacity was 56.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. An ink or coating composition comprising an alkoxylated polymer, wherein the alkoxylated polymer comprises:
   (a) a backbone with one or more alkoxylated sites;
   (b) terminal ends each of which is a site comprising a functional polar group with an active hydrogen; and
   (c) one or more polyfunctional monomers and/or oligomers having two or more functional polar groups with an active hydrogen or mixtures thereof;
   wherein the alkoxylated polymer is present in an amount of 0.1 wt % to 3 wt %;
   wherein the alkoxylated polymer is selected from the group consisting of polyester, polyacrylic, and polyamide; and
   wherein the ink or coating composition is solvent-based or water-based, and comprises water, one or more organic solvents, or combinations thereof.

2. The ink or coating composition of claim 1, wherein the alkoxylated polymer is a polyester.

3. The ink or coating composition of claim 1, wherein the functional polar groups are each independently selected from the group consisting of hydroxyl, carboxyl, thiol, amino, imino, amido, or ureido.

4. The ink or coating composition of claim 1, wherein the alkoxylated polymer comprises at least one hydroxyl group.

5. The ink or composition of claim 1, wherein the alkoxylated polymer comprises at least one carboxyl group.

6. The ink or coating composition of claim 1, wherein at least one polyfunctional monomer and/or oligomer is functionalized by at least one hydroxyl group.

7. The ink or coating composition of claim 1, wherein at least one polyfunctional monomer and/or oligomer is functionalized by at least one carboxyl group.

8. The ink or coating composition of claim 1, where at least one polyfunctional monomers and/or oligomers are functionalized by one or more diols.

9. The ink or coating composition of claim 1, wherein at least one polyfunctional monomers and/or oligomers are functionalized by one or more COOH functional diols, or mixtures thereof.

10. The ink or coating composition of claim 9, wherein at least one COOH functional diol is dimethylolpropionic acid.

11. The ink or coating composition of claim 1, wherein at least one polyfunctional monomers and/or oligomers are functionalized by one or more diacids or anhydrides, or mixtures thereof.

12. The ink or coating composition of claim 11, wherein at least one anhydride is tetrahydrophthalic anhydride.

13. The ink or coating composition of claim 1, wherein the one or more polyfunctional monomers or oligomers is selected from the group consisting of trimethylol propane, ethylene glycol, diethylene glycol, 1,4-butandiol, 1,3-propanediol, hexanediol, 2-methyl-1,3-propanediol, neopentylglycol, trimethylolethane, pentaerythritol, glycerol, 1,2,4-benzenetriol, 1,3,5-benzenetriol, 1,2,3-benzenetriol, acrylic and methacrylic acid, itaconic acid, crotonic acid, maleic acid, succinic acid, malonic acid, diethyl malonic acid, monobutyl maleate, 1,3-acetonedicarboxylic acid, azelaic acid, benzylmalonic acid, biphenyl-4,4'-dicarboxylic acid, 1,3,5-cyclohexanetricarboxylic acid, cyclohexylsuccinic acid, trimethylolpropane tris(3-mercaptopropionate); trimethylolpropane tris(2-mercaptoacetate); pentaerythritol tetrakis(2-mercaptoacetate); pentaerythritol tetrakis(3-mercaptopropionate); 2,2'-(ethylenedioxy) diethanethiol; 1,3-propanedithiol; 1,2-ethanedithiol; 1,4-butanedithiol; tris[2-(3-mercaptopropionyloxy)ethyl] isocyanurate; and 3,4-ethylenedioxythiophene, m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine, ethylenediamine, propylenediamine, and tris(2-diaminoethyl)amine, bis(imino)pyridine; 3,3'-iminodipropionitrile; [2,6-bis(1-phenylimino)ethyl]pyridine, norbornene diamide, 1,6-diazacyclododecane-2,5-dione, dimethylbis(ureido) silane, and ureidopyrimidinone.

14. The ink or coating composition of claim 1, wherein the alkoxylated polymer is an alkoxylated polyester comprising:
   (a) a backbone with one or more alkoxylated sites;
   (b) terminal ends each of which is a site comprising a functional polar group with an active hydrogen;
   (c) one or more di- or higher functional polyols; and
   (d) one or more diacids or anhydrides, or mixtures thereof.

15. The ink or coating composition of claim 1, wherein the alkoxylated polymer is an alkoxylated polyacrylic comprising:
   (a) a backbone with one or more alkoxylated sites;
   (b) terminal ends each of which is a site comprising a functional polar group with an active hydrogen;
   (c) one or more hydroxyl functional acrylic monomers, or carboxyl functional acrylic monomers, or mixtures thereof;
   (d) one or more additional acrylic or styrenic monomers; and
   (e) one or more di- or higher functional polyols.

16. The ink or coating composition of claim 1, wherein the alkoxylated polymer is derived from a propoxylation, ethoxylation, or butoxylation process.

17. The ink or coating composition of claim 16, wherein the alkoxylated polymer is derived from a propoxylation process.

18. The ink or coating composition of claim 1, wherein the alkoxylated polymer is present in an amount of 0.1 wt % to less than 3 wt %.

19. The ink or coating composition of claim 1, wherein the alkoxylated polymer is present in an amount of 1 wt % to 2 wt %.

20. The ink or coating composition of claim 1, wherein the solvent is selected from petroleum solvents, alcohols, esters, and combinations thereof.

21. The ink or coating composition of claim 1, wherein the alkoxylated polymer functions as a dispersant or low-tack binder.

22. The ink or coating composition of claim 1, which further comprises a colorant.

23. The ink or coating composition of claim 22, which is a printing ink.

24. The printing ink of claim 23, wherein the ink is a white ink.

25. The printing ink of claim 23, wherein the ink is a flexographic or gravure printing ink.

26. The printing ink of claim 23, which has a higher opacity than a printing ink that does not contain an alkoxylated polymer dispersant, at an equal pigment loading.

27. The printing ink of claim 23, which has a higher opacity than a printing ink that does not contain an alkoxylated polymer dispersant, at the same viscosity.

28. The printing ink of claim 23, which has a higher opacity than a printing ink that does not contain an alkoxylated polymer dispersant, at a lower viscosity than the printing ink that does not contain an alkoxylated polymer dispersant.

29. The printing ink of claim 23, which has a lower viscosity than a printing ink that does not contain an alkoxylated polymer dispersant, at equal pigment loading.

\* \* \* \* \*